US012154338B2

(12) United States Patent
Ruiz-Garcia et al.

(10) Patent No.: US 12,154,338 B2
(45) Date of Patent: Nov. 26, 2024

(54) APPARATUS AND METHOD OF IMAGE PROCESSING TO DETECT A SUBSTANCE SPILL ON A SOLID SURFACE

(71) Applicant: SeeChange Technologies Limited, Manchester (GB)

(72) Inventors: Ariel Edgar Ruiz-Garcia, Manchester (GB); David Packwood, Leicester (GB); Michael Andrew Pallister, Beaconsfield (GB)

(73) Assignee: SeeChange Technologies Limited, Manchester (GB)

( * ) Notice: Subject to any disclaimer, the term of this patent is extended or adjusted under 35 U.S.C. 154(b) by 372 days.

(21) Appl. No.: 17/544,400

(22) Filed: Dec. 7, 2021

(65) Prior Publication Data

US 2022/0319177 A1 Oct. 6, 2022

(30) Foreign Application Priority Data

Mar. 31, 2021 (GB) ..................................... 2104689

(51) Int. Cl.
*G06V 20/50* (2022.01)
*G06T 7/11* (2017.01)
(Continued)

(52) U.S. Cl.
CPC ................ *G06V 20/50* (2022.01); *G06T 7/11* (2017.01); *G06T 7/194* (2017.01); *G06V 10/457* (2022.01);
(Continued)

(58) Field of Classification Search
CPC .... G06V 20/50; G06V 10/457; G06V 10/764; G06V 10/774; G06V 10/82; G06V 20/52;
(Continued)

(56) References Cited

U.S. PATENT DOCUMENTS 9,987,752 B2 * 6/2018 Fisher .................. G05D 1/0246
10,189,692 B2 * 1/2019 High ..................... G06Q 10/02
(Continued)

FOREIGN PATENT DOCUMENTS

WO 2019/140126 7/2019

OTHER PUBLICATIONS

Yang, Kailun, et al. "Unifying terrain awareness for the visually impaired through real-time semantic segmentation." Sensors 18.5 (2018): 1506. (Year: 2018).*
(Continued)

*Primary Examiner* — Edward F Urban
*Assistant Examiner* — Jongbong Nah
(74) *Attorney, Agent, or Firm* — NIXON & VANDERHYE P.C.

(57) ABSTRACT

System, apparatus and method of image processing to detect a substance spill on a solid surface such as a floor is disclosed. First data representing a first image, captured by an image sensor, of a region including a solid surface, is received. A trained semantic segmentation neural network is applied to the first image data to determine, for each pixel of the first image, a spill classification value associated with the pixel, the determined spill classification value for a given pixel indicating the extent to which the trained semantic segmentation neural network estimates, based on its training, that the given pixel illustrates a substance spill. The presence of a substance spill on the solid surface is detected based on the determined spill classification values of the pixels of the first image.

18 Claims, 5 Drawing Sheets receiving first data representing a first image of a region including a solid surface, the first image comprising a plurality of pixels — 102 applying a trained semantic segmentation neural network to the first image data to determine for each pixel a spill classification value — 104 detecting the presence of a substance spill on the solid surface based on the determine spill classification values of the pixels of the first image — 106

(51) Int. Cl.
*G06T 7/194* (2017.01)
*G06V 10/44* (2022.01)
*G06V 10/764* (2022.01)
*G06V 10/774* (2022.01)
*G06V 10/82* (2022.01)

(52) U.S. Cl.
CPC .......... *G06V 10/764* (2022.01); *G06V 10/774* (2022.01); *G06V 10/82* (2022.01); *G06T 2207/20081* (2013.01); *G06T 2207/20084* (2013.01)

(58) Field of Classification Search
CPC ........ G06V 10/14; G06V 10/26; G06V 10/36; G06V 20/56; G06V 20/70; G06V 10/759; G06V 10/765; G06T 7/11; G06T 7/194; G06T 2207/20081; G06T 2207/20084; G06T 7/0008; G06T 2207/10004; G06T 2207/10016; G06T 2207/10024; G06T 2207/30232; G08B 21/182; H04N 7/18
See application file for complete search history.

(56) References Cited

U.S. PATENT DOCUMENTS

| | | | | |
|---|---|---|---|---|
| 10,885,635 | B2 * | 1/2021 | Bala | G06F 18/24143 |
| 2014/0168427 | A1 * | 6/2014 | Argue | G06V 20/52<br>382/103 |
| 2017/0292917 | A1 * | 10/2017 | O'Dell | G01J 5/047 |
| 2019/0235511 | A1 * | 8/2019 | Tiwari | G01V 9/005 |
| 2020/0348183 | A1 * | 11/2020 | Agarwal | G01J 5/12 |

OTHER PUBLICATIONS

Liu, Chao, Sandra Skaff, and Manuel Martinello. "Learning Discriminative Spectral Bands for Material Classification." Advances in Visual Computing: 11th International Symposium, ISVC 2015, Las Vegas, NV, USA, Dec. 14-16, 2015, Proceedings, Part | 11 . Springer International Publishing, 2015. (Year: 2015).*

International Search Report and Written Opinion of the International Searching Authority for PCT/GB2022/050788 mailed Jun. 29, 2022, 17 pages.

K. Yang et al, "Unifying Terrain Awareness for the Visually Impaired through Real-Time Semantic Segmentation" Sensors, vol. 18, No. 5, May 10, 2018, 32 pages.

A. Siris et al, "Inferring Attention Shift Ranks of Objects for Image Saliency" 2020 IEEE/CVF Conference on Computer Vision and Pattern Recognition (CVPR), Jun. 13, 2020, 11 pages.

C. Liu et al, "Learning Discriminative Spectral Bands for Material Classification" Lecture Notes in Computer Science, Dec. 18, 2015, pp. 671-681.

Search Report for GB2104689.1, dated Oct. 1, 2021, 9 pages.

Examination Report for GB Application No. 2104689.1 dated Aug. 3, 2023, 6 pages.

K. Yang et al, "Perception framework of water hazards beyond traversability for real-world navigation assistance systems" Proceedings of the 2018 IEEE International Conference on Robotics and Biomimetics, Dec. 12-15, 2018, 6 pages.

* cited by examiner

APPARATUS AND METHOD OF IMAGE PROCESSING TO DETECT A SUBSTANCE SPILL ON A SOLID SURFACE

This application claims priority to GB Patent Application No. 2104689.1 filed 31 Mar. 2021, the entire contents of which is hereby incorporated by reference.

TECHNICAL FIELD

The present invention relates to detecting substance spills on solid surfaces, and more particularly to an apparatus and computer-implemented method of image processing to detect a substance spill on a solid surface.

BACKGROUND

Substance spills on solid surfaces can pose serious health and safety risks. For example, liquid spills on a floor of a supermarket aisle can pose a slip risk to people walking in the aisle. This risk can be mitigated by attending to the spill promptly. For example, a sign may be placed near the spill to alert people to the spill and/or the spill may be cleared up. It is therefore important to detect a substance spill on a solid surface in a prompt manner.

Substance spills may be detected by a person present near the spill seeing that there is a substance spill. However, this has disadvantages. Firstly, it may take some time for a person, e.g. a member of staff in a supermarket, to happen upon a spill, and hence the spill may not be detected promptly. Secondly, it involves a person being near the spill and hence being exposed to the health and safety risk that the spill poses.

For these reasons, it would be desirable to detect substance spills on solid surfaces automatically, e.g. with no or reduced involvement of humans. However, this also poses problems. For example, substance spills on solid surfaces, by their nature, do not have a well-defined generic physical form or shape. For example, there may be little or no correlation between the shape of one spill and the shape of another spill. Accordingly, it is difficult to train an object detection machine learning model to reliably identify instances of substance spills in images. It would be desirable to provide for reliable detection of substance spills on solid surfaces.

SUMMARY

According to a first aspect of the present disclosure, there is provided a computer-implemented method of image processing to detect a substance spill on a solid surface, the method comprising: receiving first data representing a first image, captured by an image sensor, of a region including a solid surface, the first image comprising a plurality of pixels; applying a trained semantic segmentation neural network to the first image data to determine, for each pixel of the first image, a spill classification value associated with the pixel, the determined spill classification value for a given pixel indicating the extent to which the trained semantic segmentation neural network estimates, based on its training, that the given pixel illustrates a substance spill; and detecting the presence of a substance spill on the solid surface based on the determined spill classification values of the pixels of the first image.

According to a second aspect of the present disclosure, there is provided a computer-implemented method of training a semantic segmentation neural network to determine spill classification values for each of a plurality of pixels of an input image, the method comprising: receiving a training data set, the training data set comprising a plurality of training images, each training image having been captured by an image sensor, each training image being of a region including a solid surface with a substance spill thereon, each training image comprising pixels, wherein in each training image, each pixel that illustrates a substance spill on a solid surface is annotated to indicate that a substance spill on a solid surface is illustrated by the pixel; and training a semantic segmentation neural network. based on the training data set.

According to a third aspect of the present disclosure, there is provided an apparatus configured to perform the method according to the first aspect and/or the second aspect.

According to a fourth aspect of the present disclosure, there is provided a system comprising the apparatus according to the third aspect wherein the apparatus is further configured to generate output information in dependence on detecting the presence of a substance spill on the solid surface and transmit the output information to a spill management system; and the spill management system.

According to a fifth aspect of the present disclosure, there is provided a computer program comprising instructions which, when executed by a computer, cause the computer to perform the method according to the first aspect and/or the second aspect.

Further features and advantages of the invention will become apparent from the following description of preferred embodiments of the invention, given by way of example only, which is made with reference to the accompanying drawings.

DETAILED DESCRIPTION

Figure 1:
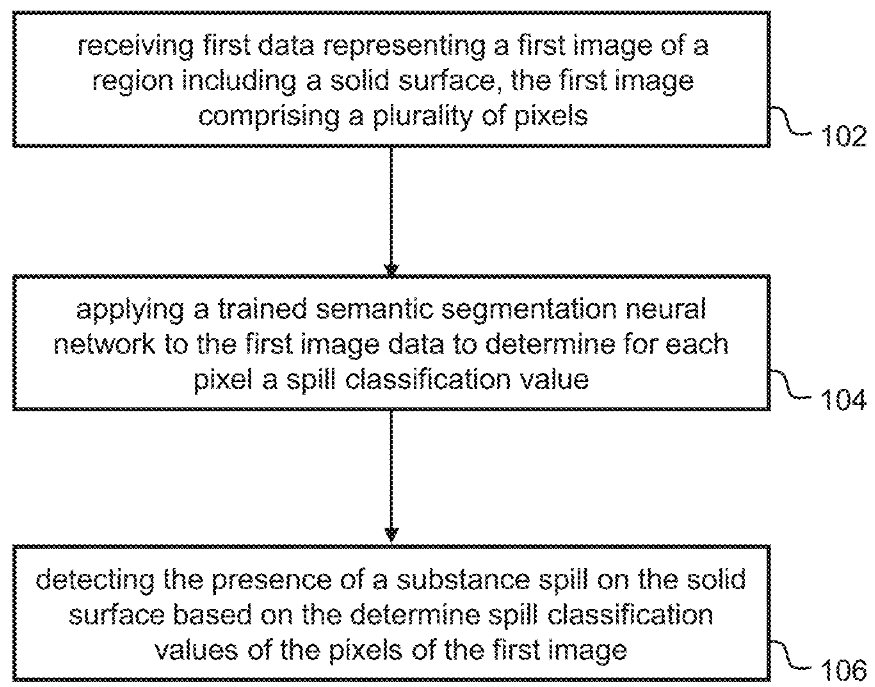
FIG. 1 is a flow diagram illustrating a method of detecting a substance spill on a solid surface, according to an example.

Referring to FIG. 1, there is illustrated a computer-implemented method of image processing to detect a substance spill on a solid surface. The method may be carried out, for example, by the apparatus 800 described below with reference to FIG. 8.

The method comprises, in step 102, receiving first data representing a first image, captured by an image sensor, of a region including a solid surface.

The first image comprises a plurality of pixels. The first data may, for example, comprise one or more pixel values for each pixel of the first image. For example, in the case of a grey-scale image, the first data may comprise an intensity value for each pixel of the first image. As another example, in the case of a colour image, the first data may comprise a value for each of Red, Green, and Blue channels associated with each pixel of the first image. The first data may also comprise information on the location of each pixel within the first image. In any case, the first data represents the first image, for example in such a way that the first image captured by the image sensor may be reproduced on the basis of the first data.

Figure 3:
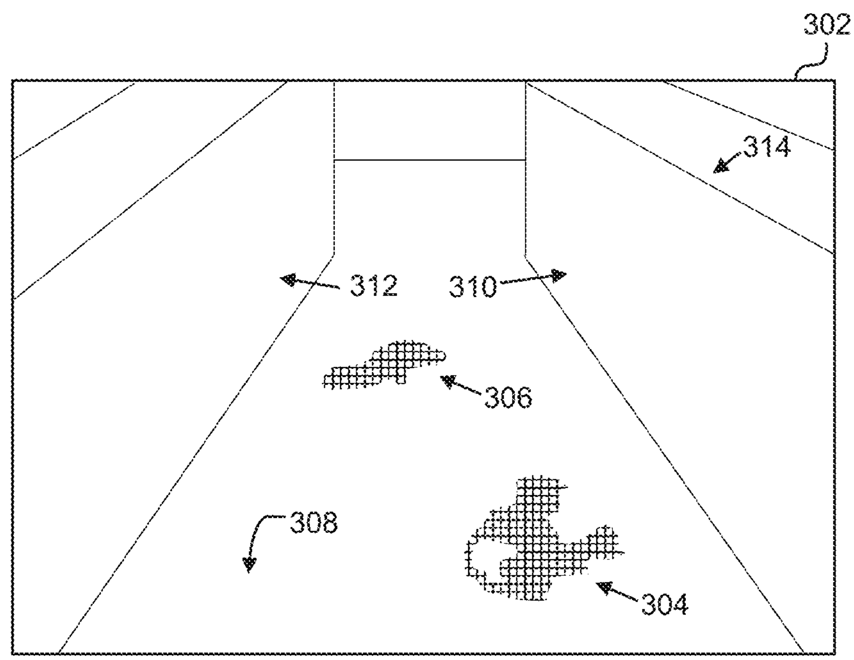
FIG. 3 is a diagram illustrating schematically a first image of a liquid spill on a floor.

An example of a first image is illustrated in FIG. 3. Referring briefly to FIG. 3, a first image 302 is of a region 314 that includes a solid surface 308. In this example, the image 302 is of an aisle of a supermarket, and the solid surface 308 is the floor 308 of the supermarket aisle. As depicted in the first image 302, the supermarket aisle is banked on either side by shelving units 310, 312. The first image 302 also shows a substance spill 304, 306 on the floor 308. The substance spill 304, 306 may be a puddle or splatter or other collection of a substance on the solid surface 308. In this example, the substance spill is a liquid spill 304, 306. In this example, there are two spills 304, 306 on different parts of the floor 308.

The spill 304, 306 may have been caused, for example, by a person spilling a substance onto the floor 308, or by a person dropping a product (not shown) on the floor 308 which product has broken and therefore spilled its contents (e.g. a liquid) onto the floor 308, thereby creating the spill 304, 306. As another example, the spill 304, 306 may have been caused by a leaking pipe or roof causing a substance (e.g. liquid) to spill onto the floor 308. In any case, such spills 304, 306 do not have a well-defined generic shape, i.e. there may be little or no correlation between the shape of one spill as compared to another spill.

Due to the accidental or unintended nature of it's occurrence, or otherwise, the spill 304, 306 may not be expected or anticipated by people walking on the floor 308. In any case, the presence of the spill 304, 306 on the floor 308 represents a health and safety risk e.g. because a person may slip on the spill 304, 306 which may cause injury. It will be appreciated that although the example of a liquid spill 304, 306 on the floor 308 of a supermarket aisle is referred to herein, the spill may be of any substance (e.g. liquid, powder, gel, grain) on any solid surface (e.g. floor, steps, workbench, public area), for example that poses a health and safety risk to people by its presence on the solid surface.

As mentioned, the method comprises receiving first data representing the first image. Returning now to FIG. 1, the method comprises, in step 104, applying a trained semantic segmentation neural network to the first image data to determine, for each pixel of the first image 302, a spill classification value associated with the pixel. In other words, the trained segmentation neural network is configured to take as input the first image data, and provide as output a spill classification value for each pixel of the first image 302.

The determined spill classification value for a given pixel indicates the extent to which the trained semantic segmentation neural network estimates, based on its training, that the given pixel illustrates a substance spill. For example, the spill classification value for a given pixel may be or otherwise indicate the probability as estimated by the trained semantic segmentation neural network, or the confidence with which the trained semantic segmentation neural network predicts, that the given pixel illustrates a substance spill. That is, the spill classification value may indicate the probability or confidence, as determined by the trained semantic segmentation neural network, that the given pixel is a pixel of the first image 302 where a spill 304, 306 is depicted.

The method comprises, in step 106, detecting the presence of a substance spill 304, 306 on the solid surface 308 based on the determined spill classification values of the pixels of the first image 302.

Detecting a substance spill based on pixel classification values determined by a trained semantic segmentation neural network may allow for reliable spill detection. For example, semantic segmentation models differ from (object) detection models. Object detection models attempt to identify instances of a given class of object in an input image. However, semantic segmentation models output a classification value or class for each pixel of an input image. Because, by their nature, substance spills on solid surfaces do not have a well-defined generic form or shape, it is difficult to train an object detection machine learning model to reliably identify instances of substance spills on solid surfaces in images. However, due to the per-pixel nature of the semantic segmentation output, pixels of the input image can be classified as depicting a substance spill or not independent of the form of the spill itself. Detecting the substance spill based on spill classification values determined for each pixel of the first image by applying the trained semantic segmentation neural network may therefore provide for reliable spill detection on solid surfaces. Improved spill detection may therefore be provided.

Semantic segmentation neural networks, that is neural networks that are configured to implement semantic segmentation, are known per se. Any semantic segmentation neural network may, in principle, be used. Nonetheless, an example semantic segmentation neural network architecture that may be used in examples described herein is illustrated schematically in FIG. 2.

Figure 2:
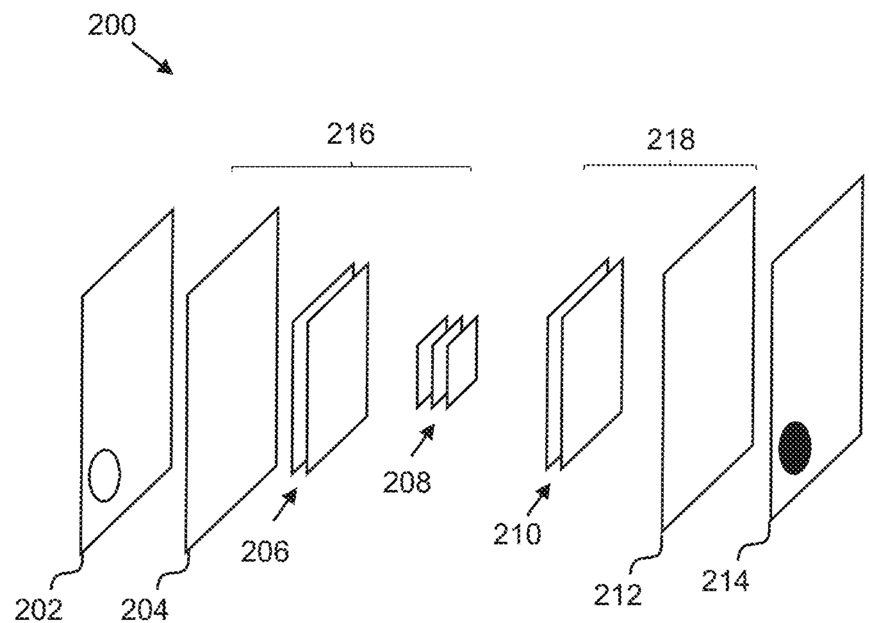
FIG. 2 is a schematic diagram illustrating a semantic segmentation neural network, according to an example.

Referring to FIG. 2, the example semantic segmentation neural network 200 comprises an encoder 216 and a decoder 218. The encoder 216 uses operations, such as convolutions and/or pooling operations, to encode or downsample an input image 202 into progressively smaller but denser feature representations 206, 208. As a result of the encoding a compressed representation 208 of the input image 202 is produced. The decoder 218 uses operations, such as transpose convolutions, to decode or upsample the compressed representation 208 into progressively larger but more sparse feature representations 210, 212. Specifically, the decoder 218 decodes the compressed representation 208 so that the final representation 212 has the same size as the input image 202. The final representation 212 may consist of classification values (e.g. probabilities or prediction confidences for a given classification) or classifications (e.g. "spill" or "background") for each pixel of the input 202, for each class that the semantic segmentation neural network 200 has been trained on. The output of the semantic segmentation neural network may be a bitmap 214 consisting of the classification values or classes for each pixel of the input image 202.

Other semantic segmentation neural networks may be used. An example of a known semantic segmentation neural network that may be used in examples described herein is the open source "DeepLab" semantic segmentation model developed by Google®. For example, "DeepLab-V3" may be used.

In some examples, the trained semantic segmentation neural network may be provided by training a semantic segmentation neural network based on a training data set.

For example, the training data set may comprise a plurality of training images, each training image having been captured by an image sensor, each training image being of a region including a solid surface with a substance spill thereon, each training image comprising pixels. In each training image, each pixel that illustrates a substance spill on a solid surface is annotated to indicate that a substance spill on a solid surface is illustrated by the pixel. The semantic segmentation neural network may be trained based on this training data, for example using the annotations as a supervisory signal for supervised learning. For example, the encoder 216 and decoder 218 may be iteratively adjusted so as to correctly classify pixels in each of the training images, as judged against the class annotations.

In some examples, the trained semantic segmentation neural network may be obtained from a storage. For example, a semantic segmentation neural network may have been pre-trained, for example in a manner similar to as described above, and the trained semantic segmentation neural network stored in data storage. The trained semantic segmentation neural network may then be retrieved from the storage an applied to the first image as in step 104 of FIG. 1.

As mentioned, the presence of a substance spill 304, 306 on the solid surface 308 is detected based on the determined spill classification values of the pixels of the first image 302.

In some examples, a spill 304, 306 may be detected based directly on the spill classification values. However, in other examples, the spill classification value determined for each pixel may be used to determine a class for the pixel. For example, the method may comprise, for each pixel, based on the spill classification value determined for the pixel, classifying the pixel as either a spill pixel illustrating a substance spill 304, 306 or another class. Detecting the presence of the substance spill 304, 306 on the solid surface may then be based on the classifications of the pixels of the first image 302.

In some examples, the classification of the pixel may be determined based only on the spill classification value. For example, pixels with spill classification values above a given threshold (e.g. 0.5) may be classed as spill pixels, whereas pixels with spill classification values below the given threshold may be classed as background pixels.

However, in some examples, the classification of the pixel may be based on both the spill classification value and other classification values. For example, the trained semantic segmentation neural network may be configured to determine, for each pixel of the first image to which it is applied, both the spill classification value and one or more other classification values associated with a respective one or more other classes. For each pixel, classifying the pixel may be based on both the spill classification value and the one or more other classification values associated with the pixel. For example, the pixel may be classified according to which one of the spill classification value and each respective one of the one or more other classification values is the highest for the pixel. Determining the classification for a pixel based on more than one determined classification values may provide for more reliable spill detection, for example as compared to using spill classification values alone, as it incorporates an expression of the semantic segmentation neural networks training on different classes.

In some examples, one of the other classes of pixel may be background pixels. In this case, the respective classification value may be a background classification value indicating, for a given pixel, the extent to which the trained semantic segmentation neural network estimates, based on its training, that the given pixel illustrates a background. For example, background may include anything that is not a spill. Alternatively or additionally, one of the other classes of pixel may be solid surface pixels. In this case, the respective classification value may be a solid surface classification value indicating, for a given pixel, the extent to which the trained semantic segmentation neural network estimates, based on its training, that the given pixel illustrates a solid surface, for example a floor 308. Similarly to as described above, the semantic segmentation neural network in these cases may be trained based on training data including training images where not only spills are annotated as such, but also background and/or solid surfaces, such as a floor 308, are also annotated as such.

In these examples, for each pixel of the first image 302, the sematic segmentation neural network may output two channels of classification value, for example spill and background classification values, or for example three channels of classification value, for example spill, background, and solid surface (e.g. floor) classification value. A given pixel may be classified according to which one of the spill classification value and each respective one of the other classification values (e.g. background and/or floor) is the highest for the pixel. A bitmap may be produced which indicates, for each pixel of the first image 302, the determined classification for the pixel.

Figure 4:
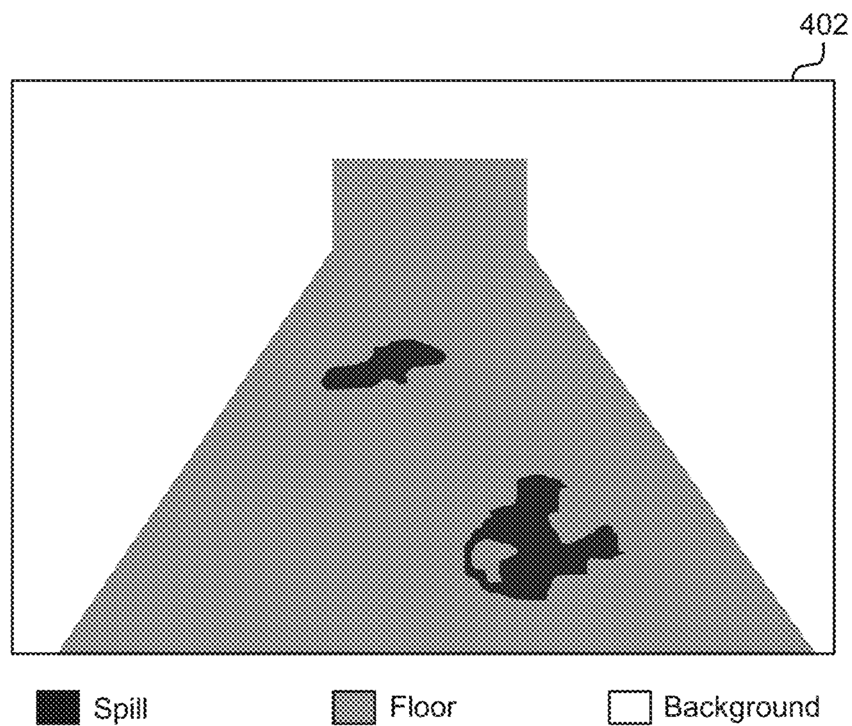
FIG. 4 is a diagram illustrating schematically a first segmentation map corresponding to the first image according to an example.

An example bitmap 402 is illustrated schematically in FIG. 4. In this example, the semantic segmentation neural network is configured to output, for each pixel, a spill classification value, a background classification value, and a solid surface (in this example floor) classification value. For each pixel, the pixel is assigned the class with the highest classification value for the pixel. The example bitmap 402 in FIG. 4 illustrates the result of this process as applied to the first image 302 of FIG. 1. For illustrative purposes, the different classes have different shades, where the spill pixels are coloured black, the floor pixels are coloured grey, and the background pixels are coloured white. Accordingly, in this example, the bitmap 402 effectively represents the segmentation of the first image 302 into spill, background, and floor classes.

Although not shown explicitly in the Figures, the classification information in the bitmap 402 may be, for example, overlaid or otherwise combined with the first image 302, for example to illustrate the determined segments in the context of the original first image 402. For example, for each pixel of the first image 302, the determined classification for the pixel may be added as another channel for the pixel, which may cause, for example the pixel to be coloured differently for each class.

As mentioned, the presence of a substance spill 304, 306 on the solid surface 308 is detected based on the determined spill classification values of the pixels of the first image 302. As described below, this may be achieved in a number of different ways.

In some examples, it may be known or predetermined that the first image 302 is only or predominantly of a solid surface 308. In these examples, a spill 304, 306 on the solid surface 308 may be detected, for example, based on a number or proportion of the pixels of the first image 302 that have a spill classification value above a threshold. For example, if it is determined that 50% or more of the pixels of the image have a substance spill classification value of 0.75 or more (e.g. where spill classification values range from 0 to 1), then it may be detected that there is a substance spill on the solid surface 308. Similarly, in some examples, a spill on the solid surface 308 may be detected, for example, based on a number or proportion of the pixels of the first image 302 classified as spill pixels, for example according to any one of the examples of classifying pixels described above. These examples may provide for relatively simple and hence computationally inexpensive spill detection.

In other examples, the method may comprise defining one or more spatial groupings of the pixels based on their respective determined spill classification values; and detecting the presence of the substance spill 304, 306 on the solid surface 308 based on the one or more defined spatial groupings. For example, a given spatial group of pixels may be a group of spill pixels, and the presence of a substance spill on the solid surface may be detected responsive to a spatial grouping being defined. Moreover, defining the spatial grouping of pixels may also allow for validation measures to be applied specifically to a particular spatial grouping of pixels, which may in turn allow for more reliable spill detection to be provided. Alternatively or additionally, this may, for example, allow for a spill 304, 306 to be located within the first image 302, and hence allow for more precise spill detection.

In some examples, defining at least one of the spatial groupings may comprise identifying an unbroken area of spill pixels, and the at least one spatial grouping may be defined as those pixels located within unbroken area of spill pixels. For example, as illustrated in FIG. 3, there are two unbroken areas of spill pixels. That is, in each area, the spill pixels form a single, continuous, mass. A unbroken area of spill pixels may be identified, for example, by taking a first spill pixel and identifying second spill pixels that touch (i.e. are directly adjacent to) the first spill pixel, and then identifying third spill pixels that touch the second spill pixels, and so on until no more spill pixels are identified. The spatial group may be defined as the indices of each of the pixels of the unbroken area. This may provide a relatively simple and hence computationally efficient way to define the spatial group. Moreover this may help ensure that only pixels classified as spill pixels are included in the spatial grouping, which may help provide reliable spill detection.

In some examples, defining at least one of the spatial groupings may comprise determining a polygon that surrounds a group of spill pixels, and the at least one spatial grouping may be defined as those pixels located within the polygon. For example, the polygon may be determined by identifying and following a spill pixel boundary (e.g. a boundary between, on the one side spill pixels and on the other side another classes of pixels) until a polygon (i.e. a closed shape) is formed. The spatial grouping may be defined as the indices of each of the pixels within the polygon. Defining a spatial grouping in this way may allow for a more comprehensive pixel grouping of spill pixels. For example, where spill pixels are occasionally interrupted by non-spill pixels, for example where a spill has holes, a polygon can nonetheless be drawn or otherwise determined so as to encompass an area of spill pixels.

Figure 5:
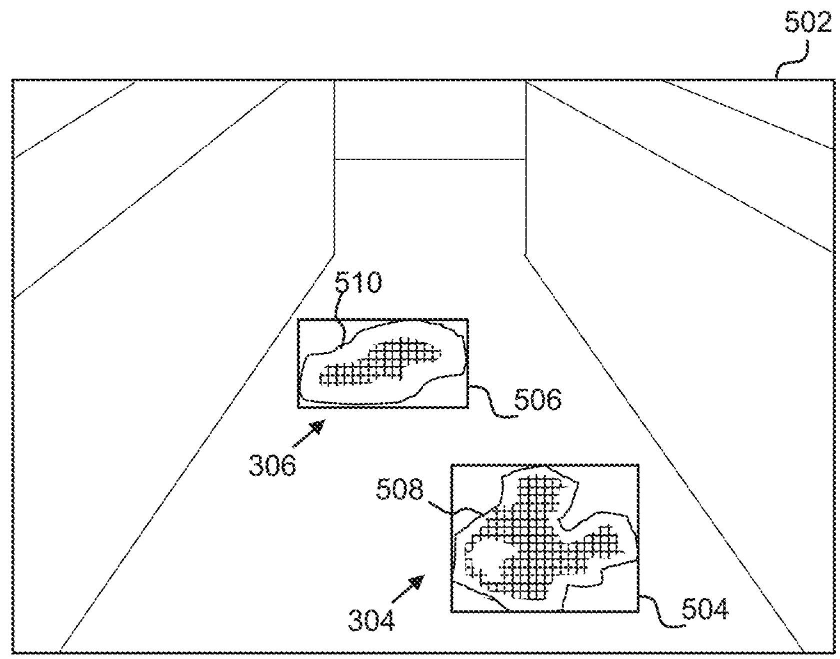
FIG. 5 is a diagram illustrating schematically the first image of the liquid spill on the floor, according to an example.

An example of a spatial grouping comprising a polygon is illustrated in FIG. 5. FIG. 5 is a schematic diagram of an image 502. The image 502 of FIG. 5 is composed of the first image 302 of FIG. 1 but overlaid with first and second polygons 508, 510 surrounding the first and second spills 304, 306, respectively. The first and second polygons 508, 510 have been generated in the manner described above based on the output of the trained semantic segmentation neural network as applied to the first image 302. The image 502 also illustrates bounding boxes 504, 506 bounding the first and second polygons 508, 510, respectively. The bounding boxes 504, 506 may help indicate the locations of the spills 304, 306 in the first image 302. Coordinates defining a bounding box 504, 506 may provide a compact way to represent the location of a spill 304, 306 in an image. This may reduce storage space associated with storing spill location information, as well as reducing bandwidth demands when communicating spill location information.

Whichever of the example ways of defining the spatial groupings of pixels is used, a spatial grouping of pixels may be defined. In some examples, the method may comprise determining one or more characteristics associated with at least one of the defined spatial groupings of pixels. Detecting the presence of the substance spill 304, 306 on the solid surface 308 may be based on the one or more determined characteristics. This may allow for a given spatial grouping to be validated against one or more criteria as a spill. For example, if the spatial grouping is validated as a spill, the presence of a spill on the solid surface may be detected. However, if the spatial grouping is not validated as a spill, then the presence of a spill on the solid surface may not be detected. Accordingly, this may allow for suppression of spurious spill detections, and in turn for more reliable spill detection.

An example characteristic associated with a spatial grouping that may be determined is a confidence characteristic for the spatial grouping. For example, the confidence characteristic may be determined based on the spill classification value of the pixels of the of the spatial grouping. For example, the confidence characteristic may be indicative of an average of the spill classification value of the pixels of the spatial grouping. For example, as mentioned above, the spill classification value may be the confidence with which the trained semantic segmentation neural network predicts the pixel depicts a substance spill 304, 306. If the confidence characteristic meets a given criteria, e.g. the average spill classification value is larger than a certain threshold, then the spatial grouping may be validated as a spill (e.g. a spill 304, 306 may be detected on the basis of the spatial grouping). However, if the confidence characteristic does not meet the given criteria, then it may be inferred that there is not sufficient confidence to detect a substance spill 304, 306 based on the grouping, and accordingly a substance spill 304, 306 may not be detected. This may suppress spurious spill detection and hence may provide for more reliable spill detection.

In some examples, the confidence characteristic may be determined based on the spill classification value only of pixels classified as spill pixels. This may help ensure that the confidence characteristic is not influenced by pixels that are not classified as spill pixels. For example, the spatial grouping may have been defined based on a polygon surrounding a group of spill pixels, but the spill may include a hole, as does for example the spill 304 as illustrated in FIG. 1. The pixels depicting the hole may not be classified by the semantic segmentation neural network as spill pixels, rather e.g. floor pixels. In this case, determining the confidence characteristic based on the spill classification value only of pixels classified as spill pixels may help ensure that the presence of the hole does not influence the confidence characteristic. This may improve the flexibility with which substance spills may be reliably detected, e.g. spills may be reliably detected whether or not they include holes.

Another example of a characteristic associated with a spatial grouping is a size characteristic indicating a size of the spatial grouping. For example, the size characteristic may be indicative of the total number of pixels in the spatial grouping, or a dimensional measure such as length, width and/or radius of the spatial grouping. For example, if the size characteristic of the grouping meets a given criteria, for example the total number of pixels is above a threshold value, then the spatial grouping may be validated as a spill 204, 306 (e.g. a spill 304, 306 may be detected on the basis of the spatial grouping). However, if the size characteristic does not meet the given criteria, then it may be inferred that the spatial grouping is too small to represent a substance spill 304, 306, and hence a substance spill 204, 306 may not be detected. This may suppress spurious detection of substance spills, and hence provide for more reliable spill detection.

Another example of a characteristic associated with a spatial grouping is a shape characteristic indicating a shape of the spatial grouping. For example, the shape characteristic may be indicative of an aspect ratio of the spatial grouping, for example a ratio of its height to its width. For example, if a spatial grouping of pixels is defined only in one row or one column of pixels, then due to the generally dispersive nature of spills, particularly of liquids, on solid surfaces, it may be inferred that the spatial grouping is unlikely to represent a substance spill 304, 306. If the shape characteristic of the grouping does meets a given criteria, for example the aspect ratio within a given range, then the spatial grouping may be validated as a spill (e.g. a spill may be detected on the basis of the spatial grouping). However, if the shape characteristic does not meet the given criteria, then it may be inferred that the spatial grouping is an incorrect or unlikely shape to represent a substance spill, and hence a substance spill may not be detected. This may suppress spurious detection of substance spills, and hence provide for more reliable spill detection.

Any one or combination of the determined characteristics may be used. For example, if more than one characteristic is used, then if any one of the characteristics does not meet its associated criteria, then the spatial grouping may be rejected as illustrating a substance spill, and a spill 304, 306 may not be detected. However, for example, if all of the determined characteristics meet their respective criteria, then the spatial grouping may be validated as a spill and a spill 304, 306 may be detected responsive thereto.

As mentioned above, in some examples it may be known or predefined that the first image 302 is only or predominantly of a solid surface such as a floor 308, and hence that if a spill 304, 306 is detected, for example in any of the example ways described above, then the presence of a spill 304, 306 on a solid surface 308 is detected. However, in other examples, the first image 302 may show not only a solid surface such as a floor 308 but also other areas. For example, as per the example first image 302 of FIG. 1, the first image 302 may also show supermarket shelves 310, 312. It may be desirable to validate or otherwise determine that a detected spill is on the solid surface such as the floor 308, and hence poses a slip risk, as opposed for example to being on a supermarket shelf 310, 213, which may not pose a slip risk. Example ways in which this may be achieved are described in more detail below.

In some examples, the method may comprise determining a first parameter indicative of the extent to which one of the spatial groupings of spill pixels is surrounded by solid surface pixels; and detecting the presence of a substance spill on the solid surface may be based on the first parameter. For example, the first parameter may be indicative of a proportion of the perimeter of the spatial group that is bordered by solid surface pixels. For example, if a criteria associated with the first parameter is met, for example if the first parameter is above a given threshold, then the spatial grouping may be validated as representing a substance spill on a solid surface, and hence the presence of a substance spill 304, 306 on a solid surface 308 may be detected. However, if the criteria is not met, then it may be inferred that the spatial grouping does not represent a spill on a solid surface, and hence the presence of a substance spill 304, 306 on a solid surface may not be detected. This may provide for more reliable detection of substance spills on solid surfaces. For example, referring to FIG. 5, the spatial groupings of pixels 508, 510 are both entirely surrounded by solid surface (i.e. floor) pixels. Accordingly, for both the spatial groupings 508, 510, the first parameter may be, for example 100%, and accordingly the substance spills 304, 306 on the solid surface (in this case, floor) 308 may be detected. This first parameter may be combined with any of the characteristics mentioned above in validating a spatial grouping, in a similar way to as described above.

In some examples, the method may comprise identifying a first region (not shown) of the first image 302 in which the solid surface 308 (in this example a floor 308) is depicted; and detecting the presence of a substance spill on the solid surface 308 may be based on the determined spill classification values only of the pixels of the first image in the identified first region (not shown). For example, the first region depicting the solid surface 308 may be identified in a given view of a camera by an operative, and a notional mask may be applied to areas of the first image 302 outside this first region (not shown). As another example, the first region may be identified by applying a second trained semantic segmentation neural network (not shown) to second image data representative of a second image (not shown), captured by the camera in a condition in which it is known that there is no substance spill on the solid surface, to detect a second region of the second image (not shown) in which the solid surface 308 is depicted. For example, for a given camera view corresponding to the first image 302, the second image (not shown) may be captured and the second semantic segmentation neural network, trained to classify solid surfaces such as floors, may be applied to the second image. The location of the pixels in the second image classified as solid surface pixels may be used to define the first region of the first image. In either case, the methods of spill detection as described above may then only be applied to pixels of the first image 302 within the first region. Accordingly, any spill 304, 306 that is detected will be a substance spill on a solid surface 308.

In some examples, the method may comprise pre-processing of the first data representing the first image 302, before the semantic segmentation neural network is applied as in step 104 of FIG. 1 as described above. For example, the method may comprise applying a Gabor filter to the first image data before applying the trained semantic segmentation neural network to the first image data. A Gabor filter is a linear filter that analyses whether there is specific frequency content in an image in specific directions in a localized region around a point of analysis. It has been found that applying a Gabor filter to the first data representing the first image can emphasize edges of spills 304, 306 in the first data, which in turn may enhance the ability of the trained semantic segmentation neural network to generate accurate and reliable spill classification values and or spill classifications for the pixels of the first image 302.

Figure 9:
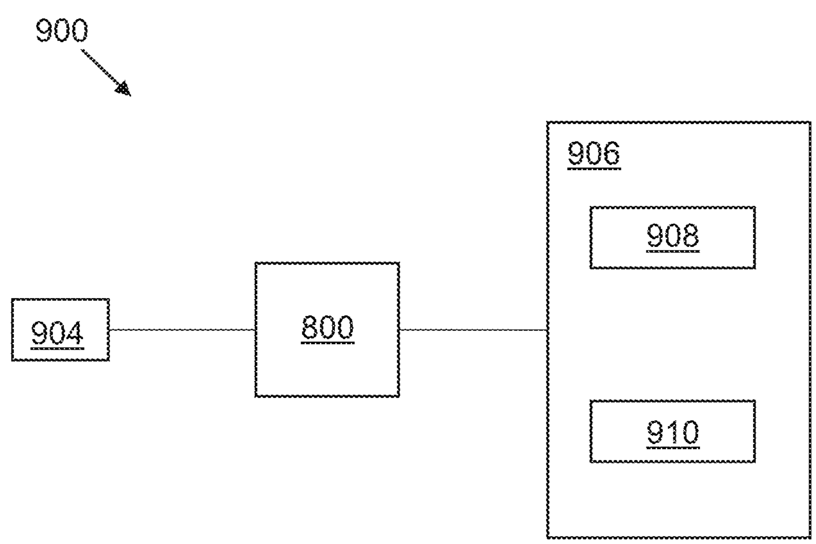
FIG. 9 is a schematic diagram of a system according to an example.

In some examples, the method may comprise generating output information in dependence on detecting the presence of a substance spill on the solid surface; and transmitting the output information to a spill management system. An example spill management system 906 is illustrated in FIG. 9 and is described in more detail below. The output information may, for example, be information indicating that the presence of a substance spill on a solid surface has been detected.

In some examples, the output information may, for example, comprise location information indicative of a location associated with the substance spill 304. 306. For example, the location associated with the substance spill 304, 306 may be determined based on location information associated with the received first data. For example, the received first data may comprise information indicating the location associated with the camera or the field of view of the camera that captured the first image 302. The location associated with the substance spill 304, 306 may also be determined based on a location within the first image 302 of the pixels associated with the detected spill, for example the location in the first image of a spatial grouping of pixels 508, 510, and/or for example a location in the first image of a bounding box 504, 506 around the spatial grouping. The location of the pixels associated with the spill in the image may then be mapped onto a location in real space. Including location information indicative of a location associated with the substance spill 304, 306 in the output information may allow the spill management system to more precisely react to the detected spill.

In some examples, the output information may comprise information configured to cause an electronic device of the spill management system to generate an alert signal to alert one or more users to the presence of the substance spill. For example, the output information may comprise information configured to cause a display screen of the spill management system to display an alert message, which may for example include the location of the spill. As another example, the output information may comprise information configured to cause a speaker to emit an alert sound. In some examples, the alert sound may be a verbal message, which may for example convey to users that that a spill has been detected and/or for example the location of the spill.

In some examples, the output information may comprise information configured to cause a robotic entity of the spill management system to attend to the substance spill. For example, the output information may comprise instructions commanding a robotic entity, such as a robot, to move to the location of the spill, place a sign at or near the spill to warn people of the presence of the spill and/or actively clear up the spill using a cleaning means.

The generation and transmission of the output information may therefore help provide that the risks posed by the presence of the spill 304, 306 can be mitigated in a prompt manner.

Figure 6:
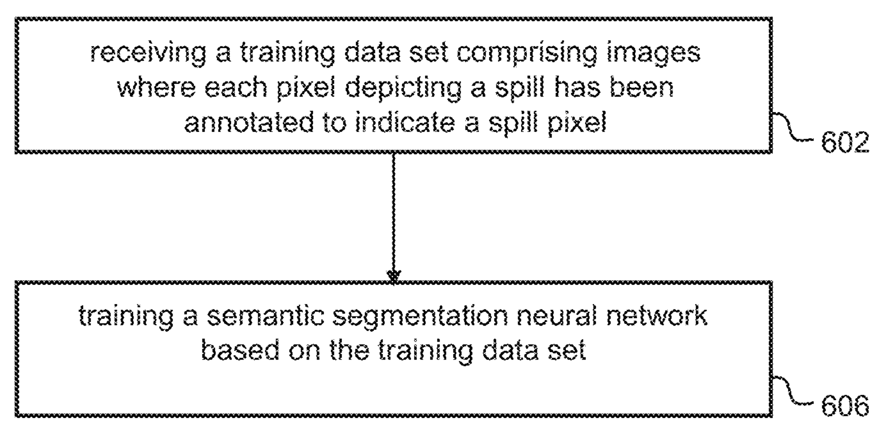
FIG. 6 is a flow diagram illustrating a method of training a semantic segmentation neural network according to an example.

Referring to FIG. 6, there is illustrated a method of training a semantic segmentation neural network to determine spill classification values for each of a plurality of pixels of an input image 302. The trained semantic segmentation neural network that results from this training may be used as the trained semantic segmentation neural network of any of the examples described above with reference to FIGS. 1 to 5.

The method comprises, in step 602, receiving a training data set. The training data set comprises a plurality of training images (not shown), each training image having been captured by an image sensor, each training image being of a region including a solid surface with a substance spill thereon, each training image comprising pixels. In each training image, each pixel that illustrates a substance spill on a solid surface is annotated to indicate that a substance spill on a solid surface is illustrated by the pixel. For example, the pixels depicting a spill may have been annotated by a user.

The method comprises, in step 604, training a semantic segmentation neural network based on the training data set. For example, elements of the semantic segmentation neural network (such as the encoder 216 and decoder 218 described above with reference to FIG. 2) may be iteratively adjusted so as to correctly classify pixels in each of the training images, as judged against the class annotations. In examples where the semantic segmentation neural network is also trained to output classification values for other classes, such as background and floor, the training images may include further class annotations as appropriate. For example, each pixel depicting a solid surface such as a floor may be annotated as depicting a solid surface, and each pixel depicting background may be annotated as depicting background. The elements of the semantic segmentation neural network may be adjusted during training to correctly classify pixels in each of the training images, as judged against the different class annotations.

Figure 7:
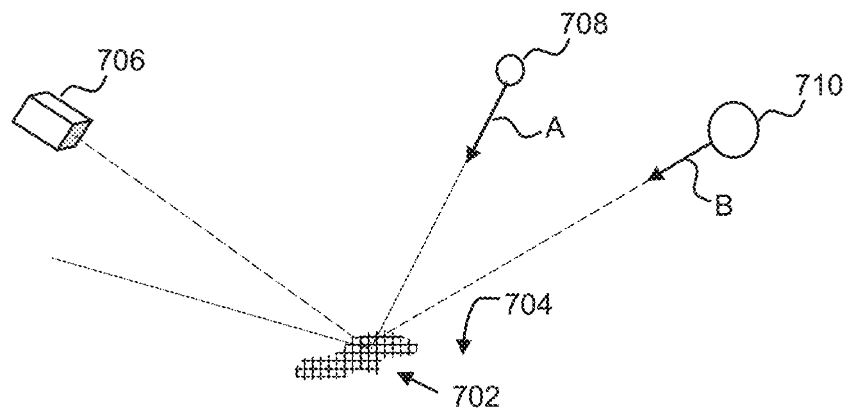
FIG. 7 is a schematic diagram illustrating a liquid spill under different lighting conditions, according to an example.

In some examples, a particular training data set may be used in order to help allow the semantic segmentation neural network to accurately classify spill pixels even when a spill in an image may not be readily visible to the human eye. Specifically, referring to FIG. 7, there is illustrated schematically a substance spill 702 in real space, images of which are captured by a camera 706. In this example, a first light source 708 provides a first lighting condition in which light incident on the spill 702 is provided in a first direction A. A second light source 710, which is on the opposite side of the spill 702 relative to the camera 706, provides a second lighting condition in which light incident on the spill 702 is provided in a second direction B. The first direction A makes an angle of around 90 degrees with the focal axis of the camera 706. It has been found that under such conditions, the spill 702, particularly liquid spills, may not be readily visible in images captured by the camera 706. However, the second direction B makes an angle of around 180 degrees with the focal axis of the camera 706 (although other angles substantially larger than 90 degrees could be chosen). It has been found that under these conditions, that same spill 702 may be readily visible in images captured by the camera. Pixels of an image taken by the camera 706 under the first lighting condition can nonetheless be annotated as spill pixels, based on the location of the spill 702 as determined from an image taken by the camera 706 under the second lighting condition, even though the spill may not be readily seen with the human eye in the image taken under the first lighting condition. It has been realised that including such annotated images in the training data on which the semantic segmentation neural network is trained, may allow the trained semantic segmentation neural network to correctly classify pixels as spill pixels in an input image, even when the spill may not be readily visible to the human eye in the input image. Accordingly, training a semantic segmentation neural network in this way may provide for improved spill detection.

According to this principle, in some examples, a method of obtaining the training data set may comprise capturing, using a first camera 706 in a first location, a first training image of a first region including a first solid surface 704 with a first substance spill 702 thereon under a first lighting condition; capturing, using the first camera 706 in the first location, a second training image of the first region including the first solid surface 704 with the first substance spill 702 thereon under a second lighting condition, the second lighting condition providing light incident on the first substance spill 702 in a direction B different to the direction A of light incident on the first substance spill 702 provided by the first lighting condition; based on pixels of the second training image that illustrate the first substance spill 702 on the first solid surface 704, annotating corresponding pixels of the first training image to indicate that the first substance spill 702 on first solid surface 704 is illustrated by the pixels; and including at least the annotated first training image in the training data set.

Accordingly, in some examples, the training data set, received as in step 602 of FIG. 6, may comprise at least a first training image, the first training image having been captured using a first camera 706 in a first location, the first training image being of a first region including a first solid surface 704 with a first substance spill 702 thereon under a first lighting condition, the first training image having been annotated, based on pixels of a second training image that illustrate the first substance spill 702 on the first solid surface 704, to annotate corresponding pixels of the first training image to indicate that the first substance spill 702 on first solid surface 704 is illustrated by the pixels, the second training image having been captured using the first camera 706 in the first location, the second training image being of the first region including the first solid surface 704 with the first substance spill 702 thereon under a second lighting condition, the second lighting condition providing light incident on the first substance spill 702 in a direction B different to the direction A of light incident on the first substance spill 702 provided by the first lighting condition.

In some examples, the trained semantic segmentation neural network may be re-trained as and when further training data becomes available. For example, where information has been received that a result of a spill detection, using the trained semantic segmentation neural network as applied to a first image, was in fact incorrect (for example a spill was detected when there was in fact no spill, or vice vera, for example as visually verified by a user), then the first image may be annotated and included into the training data set. Such training images, i.e. where the semantic segmentation neural network was initially incorrect, may be particularly useful in improving the accuracy and/or reliability of semantic segmentation neural network to provide appropriate spill classification values.

According to this principle, in some examples, a method of obtaining the training data set may comprise receiving an indication that a result of a substance spill detection, using the semantic segmentation neural network as previously trained, for a first image of a region including a solid surface is not correct; annotating each pixel of the first image 302 that illustrates a substance spill 34, 306 on a solid surface 308 to indicate that a substance spill 304, 306 on a solid surface 308 is illustrated by the pixel; and including the annotated first image (not shown) into the training data set. The semantic segmentation neural network may be trained or retrained based on a training data set including the annotated first image. For example, the re-training may be initialised with the weights or other parameters of the semantic segmentation neural network as previously trained, the annotated first image may be added to a subset of the training data set on which the semantic segmentation neural network was previously trained, and the semantic segmentation neural network may be retained based on this updated training data set.

Accordingly, in some examples, the training data set, received as in step 602 of FIG. 6, may comprise an annotated version of the first image, each pixel of the annotated version of the first image that illustrates a substance spill 304, 306 on a solid surface 308 having been annotated to indicate that a substance spill 304, 306 on a solid surface 308 is illustrated by the pixel, the annotated version of the first image having been annotated in response to receiving an indication that a result of a substance spill detection, using the semantic segmentation neural network as previously trained, for the first image of a region including a solid surface 308 was not correct.

Figure 8:
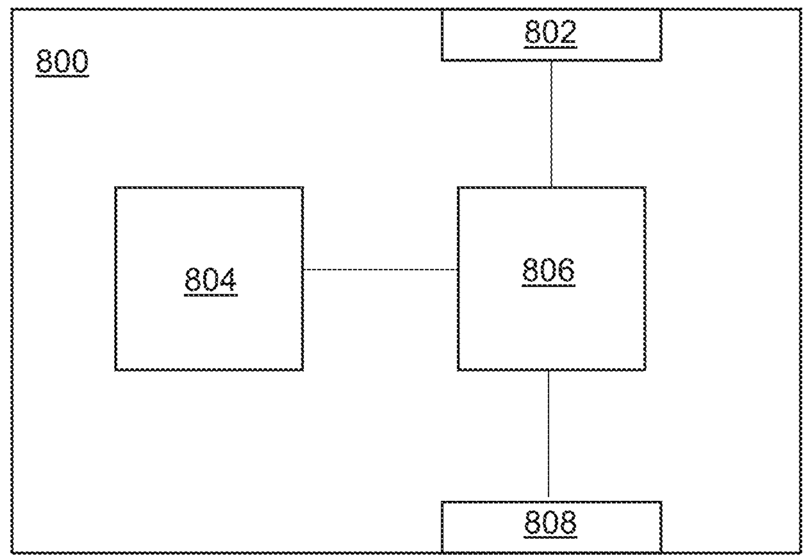
FIG. 8 is a schematic diagram of an apparatus according to an example.

Referring to FIG. 8, there is illustrated an apparatus 800 according to an example. The apparatus 800 may be configured to perform the method according to any one of the examples described above with reference to FIGS. 1 to 7. In this example, the apparatus comprises a processor 806, a memory 804, an input interface 802 and an output interface 808. The memory 804 may store a computer program comprising instructions which, when executed by the processor 806, cause the processor to perform the method according to any one of the examples described above with reference to FIGS. 1 to 7. In examples, the input interface 802 may be configured to receive, for example, the first image data, and/or for example the training data set, for example as described above. The output interface 808 may be configured to output, for example, transmit, the output information generated according to examples described above.

Referring to FIG. 9, there is illustrated a system 900 according to an example. The system 900 comprises the apparatus 800 described above with reference to FIG. 8, and a spill management system 906. The spill management system 906 is configured to receive the output information transmitted by the apparatus 800 according to examples described above. In this example, the system 900 also comprises a camera 904. The camera 904 may be configured to capture one or more first images 302 on the basis of which a spill may be detected according to any of the examples described above. Alternatively or additionally, the camera 904 may be configured to capture one or more training images on the basis of which the semantic segmentation neural network may be trained according to any of the examples described above.

In this example, the spill management system 900 comprises an alert device 908 configured to generate an alert signal to alert one or more users to the presence of the detected substance spill 304, 306 based the received output information, for example according to examples as described above. For example, the alert device 908 may be a display screen, configured to, based on the received output information, display an alert message, which may for example include the location of the detected spill 304, 306. As another example, the alert device 908 may be or comprise a speaker configured to, based on the received output information, emit an alert sound. In some examples, the alert sound may be a verbal message, which may for example convey to users that a spill has been detected and/or for example the location of the spill 304, 306.

In this example, the spill management system also comprises a robotic entity 910 configured to attend to the detected substance spill 304, 306 based on the received output information, for example according to examples described above. For example, the robotic entity 910, e.g. a robot 910, may be configured to, based on the received output information, move to the location of the spill 304, 306, place a sign at or near the spill 304, 36 to warn people of the presence of the spill 304, 306, and/or actively clear up the spill 304, 306 using a cleaning means (not shown).

The system 900 of the apparatus 800 and the spill management system 906 may therefore allow for the risks posed by the presence of a spill 304, 306 to be mitigated in a prompt manner Health and safety risks associated with substance spills on solid surfaces may therefore be reduced.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer-implemented method of image processing to detect a substance spill on a solid floor surface, the method comprising:

receiving first data representing at least a portion of a first image, captured by an image sensor, of a region including a solid floor surface;

applying a trained semantic segmentation neural network to the first data to determine, for each of a plurality of pixels of the portion of the first image, a set of classification values associated with the pixel, said set including at least a spill classification value and a solid floor surface classification value, the determined spill classification value and solid floor surface classification value for a given pixel indicating the extent to which the trained semantic segmentation neural network estimates, based on its training, that the given pixel illustrates a substance spill or a solid floor surface respectively;

for each of the plurality of pixels, based on the set of classification values determined for the pixel, classifying the pixel as either a spill pixel illustrating a substance spill, a solid floor surface pixel, or another class; and based on the classification of a first plurality of said pixels as spill pixels and a second plurality of said pixels as solid floor surface pixels, detecting that the first plurality of spill pixels represent a substance spill on the solid floor surface.

2. The computer-implemented method according to claim 1, wherein the method further comprises:

generating output information in dependence on detecting the presence of a substance spill on the solid floor surface; and transmitting the output information to a spill management system.

3. The computer-implemented method according to claim 2, wherein the output information comprises one or more of:

information configured to cause an electronic device of the spill management system to generate an alert signal to alert one or more users to the presence of the substance spill; and information configured to cause a robotic entity of the spill management system to attend to the substance spill.

4. The computer-implemented method according to claim 2, wherein the output information comprises location information indicative of a location associated with the detected substance spill.

5. The computer-implemented method according to claim 1, wherein said set of classification values includes a background classification value indicating, for a given pixel, the extent to which the trained semantic segmentation neural network estimates, based on its training, that the given pixel illustrates a background.

6. The computer-implemented method according to claim 1, wherein the method comprises:

defining one or more spatial groupings of the pixels based on their respective determined spill classification values; and wherein detecting the presence of the substance spill on the solid floor surface is based on the one or more defined spatial groupings.

7. The computer-implemented method according to claim 6, wherein defining at least one of the spatial groupings comprises identifying an unbroken area of spill pixels.

8. The computer-implemented method according to claim 6, wherein defining at least one of the spatial groupings comprises determining a polygon that surrounds a group of spill pixels, and wherein the at least one spatial grouping is defined as those pixels located within the polygon.

9. The computer-implemented method according to claim 8, wherein the method comprises:

determining one or more characteristics associated with at least one of the defined spatial groupings of pixels; and wherein detecting the presence of the substance spill on the solid floor surface is based on the one or more determined characteristics.

10. The computer-implemented method according to claim 9, wherein the determined characteristics for a given spatial grouping comprise one or more of:

a confidence characteristic determined based on the spill classification value of pixels of the given spatial grouping;

a size characteristic indicating a size of the given spatial grouping; and a shape characteristic indicating a shape of the given spatial grouping.

11. The computer-implemented method according to claim 10, wherein the confidence characteristic is indicative of an average of the spill classification value of the pixels of the given spatial grouping.

12. The computer-implemented method according to claim 10, wherein the confidence characteristic is determined based on the spill classification value only of pixels classified as spill pixels.

13. The computer-implemented method according to claim 6, wherein the method comprises:

determining a first parameter indicative of the extent to which one of the spatial groupings of spill pixels is surrounded by solid floor surface pixels; and wherein detecting the presence of a substance spill on the solid floor surface is based on the first parameter.

14. The computer-implemented method according to claim 1, wherein the method comprises:

identifying a first region of the first image in which the solid floor surface is depicted; and wherein detecting the presence of a substance spill on the solid floor surface is based on the determined spill classification values only of the pixels of the first image in the identified first region.

15. The computer-implemented method according to claim 1, wherein the method comprises:

applying a Gabor filter to the first data before applying the trained semantic segmentation neural network to the first data.

16. A computer-implemented method of training a semantic segmentation neural network to determine spill classification values for each of a plurality of pixels of a portion of an input image, the method comprising:

receiving a training data set, the training data set comprising a plurality of training images, each training image having been captured by an image sensor, each training image being of a region including a solid floor surface with a substance spill thereon, each training image comprising pixels, wherein in each training image, each pixel that illustrates a substance spill on a solid floor surface is annotated to indicate that a substance spill on a solid floor surface is illustrated by the pixel; and training a semantic segmentation neural network based on the training data set, the training configured to enable the semantic segmentation neural network to:

determine, for each of a plurality of pixels of a portion of a first received image, a set of classification values associated with the pixel, said set including at least a spill classification value and a solid floor surface classification value, the determined spill classification value and solid floor surface classification value for a given pixel indicating the extent to which the trained semantic segmentation neural network estimates, based on its training, that the given pixel illustrates a substance spill or a solid floor surface respectively;

for each of the plurality of pixels, based on the set of classification values determined for the pixel, classifying the pixel as either a spill pixel illustrating a substance spill, a solid floor surface pixel, or another class; and based on the classification of a first plurality of said pixels as spill pixels and a second plurality of said pixels as solid floor surface pixels, detecting that the first plurality of spill pixels represent a substance spill on the solid floor surface.

17. The method according to claim 16, wherein the method comprises:

capturing, using a first camera in a first location, a first training image of a first region including a first solid floor surface with a first substance spill thereon under a first lighting condition;

capturing, using the first camera in the first location, a second training image of the first region including the first solid floor surface with the first substance spill thereon under a second lighting condition, the second lighting condition providing light incident on the first substance spill in a direction different to that of light incident on the first substance spill provided by the first lighting condition;

based on pixels of the second training image that illustrate the first substance spill on the first solid floor surface, annotating corresponding pixels of the first training image to indicate that the first substance spill on first solid floor surface is illustrated by the pixels; and including at least the first training image into the training data set.

18. The method according to claim 16, wherein the method comprises:

receiving an indication that a result of a substance spill detection, using the semantic segmentation neural network as previously trained, for a first image of a region including a solid floor surface is not correct;

annotating each pixel of the first image that illustrates a substance spill on a solid floor surface to indicate that a substance spill on a solid floor surface is illustrated by the pixel; and including the annotated first image into the training data set.

* * * * *